United States Patent
Chen et al.

(10) Patent No.: US 11,447,643 B2
(45) Date of Patent: Sep. 20, 2022

(54) HARD COATING LAYERED OPTICAL FILM, POLARIZER COMPRISING THE SAME, AND IMAGE DISPLAY COMPRISING THE HARD COATING LAYERED OPTICAL FILM AND/OR THE POLARIZER COMPRISING THE SAME

(71) Applicant: BenQ Materials Corporation, Taoyuan (TW)

(72) Inventors: Ching-Huang Chen, Taoyuan (TW); Tze-Chi Wang, Taoyuan (TW); Kuo-Hsuan Yu, Taoyuan (TW); Gang-Lun Fan, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 30 days.

(21) Appl. No.: 17/318,107

(22) Filed: May 12, 2021

(65) Prior Publication Data
US 2021/0261787 A1    Aug. 26, 2021

Related U.S. Application Data

(63) Continuation of application No. 16/801,284, filed on Feb. 26, 2020, now Pat. No. 11,053,393, and a continuation of application No. 16/265,907, filed on Feb. 1, 2019, now abandoned.

(51) Int. Cl.
*G02B 1/14* (2015.01)
*C09D 5/00* (2006.01)
*C09D 175/14* (2006.01)
*C09D 7/47* (2018.01)
*G02B 1/111* (2015.01)
*C09D 7/40* (2018.01)
*C09D 135/02* (2006.01)
*C09D 7/65* (2018.01)
*C09D 175/16* (2006.01)

(52) U.S. Cl.
CPC ............. *C09D 5/006* (2013.01); *C09D 5/002* (2013.01); *C09D 7/47* (2018.01); *C09D 7/65* (2018.01); *C09D 7/67* (2018.01); *C09D 7/70* (2018.01); *C09D 135/02* (2013.01); *C09D 175/14* (2013.01); *C09D 175/16* (2013.01); *G02B 1/111* (2013.01); *G02B 1/14* (2015.01); *Y10T 428/24355* (2015.01); *Y10T 428/24364* (2015.01)

(58) Field of Classification Search
CPC .. G02B 1/11; G02B 1/111; G02B 1/14; C09D 175/00; C09D 175/04–16; C09D 133/04–16; C08J 7/046
See application file for complete search history.

(56) References Cited

U.S. PATENT DOCUMENTS

| | | | | |
|---|---|---|---|---|
| 2006/0141243 A1* | 6/2006 | Ibuki | ............. | G02B 1/11 428/447 |
| 2007/0146887 A1* | 6/2007 | Ikeda | ............. | G02B 1/111 359/586 |
| 2008/0260997 A1* | 10/2008 | Iwata | ............. | G02B 5/0278 428/141 |
| 2009/0176077 A1* | 7/2009 | Horio | ............. | G02B 1/105 428/217 |
| 2009/0246490 A1* | 10/2009 | Ibuki | ............. | G02B 5/02 428/212 |
| 2010/0020398 A1* | 1/2010 | Horio | ............. | C08J 7/043 359/488.01 |
| 2010/0079868 A1* | 4/2010 | Asakura | ............. | G02B 5/0268 359/586 |
| 2010/0165460 A1* | 7/2010 | Furui | ............. | G02B 1/14 359/488.01 |
| 2011/0159285 A1* | 6/2011 | Choi | ............. | C08G 18/7837 428/375 |
| 2013/0250414 A1* | 9/2013 | Eguchi | ............. | G02B 1/111 359/488.01 |
| 2013/0279155 A1* | 10/2013 | Kuroda | ............. | G09F 13/04 362/97.4 |
| 2014/0044891 A1* | 2/2014 | Shibata | ............. | G02B 5/3083 428/1.31 |
| 2014/0146454 A1* | 5/2014 | Nozawa | ............. | G02B 5/0263 361/679.01 |
| 2014/0211316 A1* | 7/2014 | Furui | ............. | B32B 23/12 359/599 |
| 2014/0247486 A1* | 9/2014 | Shibata | ............. | G02B 1/11 359/488.01 |
| 2014/0248478 A1* | 9/2014 | Saito | ............. | C08J 7/042 428/215 |

(Continued)

FOREIGN PATENT DOCUMENTS

CN    101685168 A    3/2010
CN    102382291 A    3/2012

(Continued)

*Primary Examiner* — Z. Jim Yang

(57) ABSTRACT

This invention is to provide a hard coating film, comprising a polymethyl methacrylate (PMMA) base film and an anti-glare hard coating layer formed thereon, wherein the anti-glare hard coating layer comprises a (meth)acrylate composition, an initiator, a plurality of silica nanoparticles, a plurality of organic microparticles and a leveling agent. The (meth)acrylate composition comprises a urethane (meth)acrylate oligomer with a functionality of 6 to 15 and a molecular weight ranging between 1,000 and 4,500, and at least one (meth)acrylate monomer with a functionality of 3 to 6, and at least one (meth)acrylate monomer with functionality of less than 3.

6 Claims, No Drawings

(56) References Cited

U.S. PATENT DOCUMENTS

| | | | | |
|---|---|---|---|---|
| 2014/0340755 A1* | 11/2014 | Eguchi | ................ | G02B 5/0242 359/601 |
| 2015/0140279 A1* | 5/2015 | Kang | ................ | C09D 4/00 428/174 |
| 2015/0252207 A1* | 9/2015 | Ishikawa | ................ | C09D 4/00 428/337 |
| 2015/0355386 A1* | 12/2015 | Horii | ................ | G02B 5/0221 359/487.02 |
| 2016/0145449 A1* | 5/2016 | Hilgers | ................ | C09D 4/00 428/327 |
| 2016/0195642 A1* | 7/2016 | Eguchi | ................ | G02B 5/0294 359/601 |
| 2017/0131439 A1* | 5/2017 | Kobori | ................ | C08J 7/044 |
| 2018/0148609 A1* | 5/2018 | Ono | ................ | G02B 5/0268 359/586 |
| 2018/0329125 A1* | 11/2018 | Hikita | ................ | G02B 5/0263 361/679.01 |
| 2019/0211168 A1* | 7/2019 | Thompson | ................ | G02B 1/111 359/488.01 |
| 2019/0321850 A1* | 10/2019 | Song | ................ | G02B 5/02 428/212 |
| 2019/0322896 A1* | 10/2019 | Song | ................ | G02B 5/0242 359/601 |
| 2019/0324173 A1* | 10/2019 | Saito | ................ | G02B 5/0294 359/601 |
| 2019/0337273 A1* | 11/2019 | An | ................ | G09F 13/04 362/97.4 |
| 2019/0359775 A1* | 11/2019 | Ezoe | ................ | G02B 1/11 428/447 |
| 2020/0192001 A1 | 6/2020 | Sakakibara | ................ | B32B 23/12 359/599 |
| 2020/0316826 A1* | 10/2020 | Hosokawa | ................ | B32B 27/365 |
| 2020/0398541 A1* | 12/2020 | Fujimoto | ................ | B32B 27/365 |

FOREIGN PATENT DOCUMENTS

| | | | | |
|---|---|---|---|---|
| CN | 103554540 A | | 2/2014 | |
| CN | 104379620 A | | 2/2015 | |
| CN | 105802483 A | | 7/2016 | |
| CN | 106662691 A | | 5/2017 | |
| CN | 108663732 A | * | 10/2018 | ........... G02B 5/0226 |
| KR | 20060051782 A | * | 5/2006 | |
| KR | 20150079052 A | | 7/2015 | |
| WO | WO-2005114271 A1 | * | 12/2005 | ........... B29C 55/023 |
| WO | WO-2012035849 A1 | * | 3/2012 | ........... B32B 23/08 |
| WO | WO-2014022363 A2 | * | 2/2014 | ........... G02B 5/0226 |
| WO | WO-2016017799 A1 | * | 2/2016 | ........... B29C 55/023 |
| WO | WO-2020075835 A1 | * | 4/2020 | |

* cited by examiner

HARD COATING LAYERED OPTICAL FILM, POLARIZER COMPRISING THE SAME, AND IMAGE DISPLAY COMPRISING THE HARD COATING LAYERED OPTICAL FILM AND/OR THE POLARIZER COMPRISING THE SAME

CROSS-REFERENCE TO RELATED APPLICATION

This divisional utility patent application claims the priority benefit of Taiwanese invention patent application serial No. 107126963, filed on Aug. 2, 2018, and U.S. utility patent application Ser. No. 16/265,907, filed on Feb. 1, 2019, and US utility patent application Ser. No. 16/801,284, filed on Feb. 26, 2020, which are incorporated herein by references.

BACKGROUND OF THE INVENTION

Field of the Invention

The present invention relates to a hard coating film for display device, and particularly relates to a hard coating film with enhanced abrasion resistance, and the polarizer comprising the hard coating film, and the display device comprising the hard coating film and/or the polarizer.

Description of the Prior Art

The screen surface of a display device, such as cathode ray tube display (CRT), liquid crystal display (LCD), plasma display (PDP), electroluminescent display (ELD), field emission display (FED), organic light emitting diode display (OLED) can be scratched easily because of use and touch. The scratch will not only lower the image quality of the display device but also deteriorate the appearance of the display screen.

It is suggested introducing a hard coating optical film to protect the top surface of a display device. The hard coating optical film commonly is a triacetyl cellulose (TAC) base film with a hard coating layer formed thereon. However, the TAC film provides a good light transmittance but high moisture absorption and high birefringence. Thus, it is a big challenge to the hard coating TAC film being used in GPS navigation devices, mobile devices and the like due to the insufficient weatherability of the hard coating TAC film.

Recently, it is suggested replacing the TAC film with a polymethyl methacrylate (PMMA) film as the base film of the hard coating film in view of the good light transmittance and the weatherability of PMMA. However, because the adhesion of the acrylate hard coating composition to the surface of PMMA film is poor, the surface of PMMA film needs to be modified before applying to a hard coating layer, such as applying corona discharged treatment or oxidation treatment, coating with an anchoring agent or a primer coating. It is also suggested generating a miscible phase between the coating layer and the base film to enhance the adhesion thereof.

The present invention is to provide a hard coating film with polymethyl methacrylate (PMMA) as base film. The hard coating film provides excellent adhesion between the hard coating layer and the base film, a good weatherability, satisfied hardness and abrasion resistance.

SUMMARY OF THE INVENTION

The present invention is to provide a hard coating film comprising a hard coating layer disposed on a polymethyl methacrylate (PMMA) base film. The hard coating layer comprises a (meth)acrylate composition and an initiator, wherein the (meth)acrylate composition comprises a polyurethane (meth)acrylate oligomer with a functionality of 6 to 15, at least one (meth)acrylate monomer with a functionality of 3 to 6, at least one (meth)acrylate monomer with functionality of less than 3, wherein the molecular weight of the urethane (meth)acrylate oligomer is ranging between 1,000 and 4,500.

In an embodiment of the hard coating film of the present invention, the (meth)acrylate composition comprises 35 to 50 weight parts of urethane (meth)acrylate oligomer with a functionality of 6 to 15, 12 to 20 weight parts of at least one (meth)acrylate monomer with a functionality of 3 to 6 and 1.5 to 12 weight parts of at least one (meth)acrylate monomer with functionality of less than 3.

In a further aspect of the present invention, the hard coating film can be coated one or one more functional coatings, such as a low refractive coating for forming a low refractive layer on the hard coating layer to obtain an anti-reflective hard coating film.

In an embodiment of the present invention, the low refractive layer comprises a binder resin, hollow silica nanoparticles, an initiator and a leveling agent. The reflectivity of the present hard coating film is ranging between 1.2% and 1.4%.

In still a further aspect of the present invention, the hard coating layer can further comprises silica nanoparticles and organic micro particles to obtain an antiglare hard coating on the PMMA base film for forming an antiglare hard coating film. The antiglare hard coating comprising organic microparticles and silica nanoparticles can also provide an excellent adhesion to the PMMA base film. In the surface of the antiglare hard coating film, the mean spacing between peaks (Sm) is ranging between 20 μm and 50 μm, the arithmetic mean deviation of surface (Ra) is ranging between 0.03 μm to 0.09 μm, the largest peak to valley height (Ry) is ranging between 0.25 μm and 0.60 μm, the ten-point mean roughness (Rz) is ranging between 0.15 μm and 0.50 μm and the root mean square slope (PΔq) is ranging between 0.5° and 1.6°. The surface of the present antiglare hard coating film with the above roughness condition can provide satisfied antiglare property and abrasion resistance.

In still a further aspect of the present invention, the antiglare hard coating layer can be coated one or one more functional coatings, such as a low refractive coating for forming a low refractive layer on the antiglare hard coating layer to obtain an anti-reflective antiglare hard coating film. In the surface of the this anti-reflective antiglare hard coating film, the mean spacing between peaks (Sm) is ranging between 20 μm and 90 μm, the arithmetic mean deviation of surface (Ra) is ranging between 0.03 μm and 0.07 μm, the largest peak to valley height (Ry) is ranging between 0.15 μm to 0.40 μm, and the ten-point mean roughness (Rz) is ranging between 0.10 μm to 0.50 μm. The surface of the present anti-reflective antiglare hard coating film with the above roughness condition can provide satisfied abrasion resistance.

A further object of the present invention is to provide a polarizer comprising a polarizing element, wherein the polarizer comprises the present hard coating film, the present anti-reflective hard coating film, the present antiglare hard coating film or the present anti-reflective antiglare hard coating film as above on the surface of the polarizer.

A yet further object of the present invention is to provide a display comprising the polarizer comprises the present hard coating film, the present anti-reflective hard coating film, the present antiglare hard coating film, the present anti-reflective antiglare hard coating film, or the present polarizer thereon on the surface of the display.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The term "(meth)acrylate" used herein refers to acrylate or methacrylate.

The invention is to provide a hard coating film on PMMA base film. The hard coating film comprises a polymethyl methacrylate (PMMA) base film and a hard coating layer thereon. The hard coating layer comprises a (meth)acrylate composition and an initiator, wherein the (meth)acrylate composition comprises a urethane (meth)acrylate oligomer with a functionality of 6 to 15, at least one (meth)acrylate monomer with a functionality of 3 to 6, at least one (meth)acrylate monomer with a functionality of less than 3, wherein the molecular weight of the urethane (meth)acrylate oligomer is ranging between 1,000 and 4,500. The present hard coating film exhibits excellent adhesion between the hard coating layer and the PMMA base film, good weatherability, satisfied hardness and abrasion resistance.

In an embodiment of the present invention, the light transmittance of the PMMA base film is more than 80% and preferably is more than 90%. The thickness of the PMMA base film used in the present is ranging between 10 µm and 100 µm, and preferably is ranging between 20 µm m and 80 µm. The thickness of the hard coating is ranging between 0.1 µm and 20 µm and is preferably between 1.0 µm and 10 µm.

In an embodiment of the present invention, the (meth) acrylate composition comprises 35 to 50 weight parts of the urethane (meth)acrylate oligomer with a functionality of 6 to 15, 12 to 20 weight parts of the at least one (meth)acrylate monomer with a functionality of 3 to 6, and 1.5 to 12 weight parts of the at least one (meth)acrylate monomer with a functionality of less than 3.

In an embodiment of the present invention, the number molecular weight of the urethane (meth)acrylate oligomer with the functionality of 6 to 15 is no less than 1,000 and preferably between 1,500 and 4,500. In a preferred embodiment of the present invention, the urethane (meth)acrylate oligomer with the functionality of 6 to 15 is preferably an aliphatic urethane (meth)acrylate oligomer with the functionality of 6 to 15.

In an embodiment of the present invention, the number molecular weight of the (meth)acrylate monomer with a functionality of 3 to 6 is less than 1,000 and preferably less than 800. The suitable (meth)acrylate monomer with a functionality of 3 to 6 used in the present invention can be, but not limited to, for example, selected from at least one of the group consisting of pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A), pentaerythritol tri (meth)acrylate (PET(M)A) or the combination thereof. The (meth)acrylate monomer with a functionality of 3 to 6 can be one of pentaerythritol triacrylate (PETA), dipentaerythritol hexaacrylate (DPHA) and dipentaerythritol pentaacrylate (DPPA), or combinations thereof.

In an embodiment of the present invention, the (meth) acrylate monomer with functionality of less than 3 can be a (meth)acrylate monomer with a functionality of 1 or 2 and a molecular weight of less than 500. The suitable (meth) acrylate monomer with functionality of less than 3 for the present invention can be but not limited to, for example, selected from at least one of the consisting of 2-ethylhexyl (meth)acrylate (2-EH(M)A), 2-hydroxyethyl (meth)acrylate (2-HE(M)A), 2-hydroxypropyl (meth)acrylate (2-HP(M)A), 2-hydroxybutyl (meth)acrylate(2-HB(M)A), 2-butoxyethyl (meth)acrylate), 1,6-hexanediol di(meth)acrylate (HDD(M) A), cyclic trimethylolpropane formal (meth)acrylate (CTF (M)A), 2-phenoxyethyl (meth)acrylate (PHE(M)A), tetrahydrofurfuryl (meth)acrylate (THF(M)A), lauryl (meth) acrylate (L(M)A), diethylene glycol di(meth)acrylate (DEGD(M)A), dipropylene glycol di(meth)acrylate (DPGD (M)A), tripropylene glycol di(meth)acrylate (TPGD(M)A), isobornyl (meth)acrylate or the combination thereof. The (meth)acrylate monomer with functionality of less than 3 can be one of 1,6-hexanediol diacrylate (HDDA), cyclotrimethylolpropane acetal acrylate (CTFA) and 2-phenoxyethyl acrylate (PHEA), or combinations thereof.

The initiator suitably used in the hard coating layer film of the present invention can be those commonly used in the related art, such as, for example, but not limited to, acetophenones, diphenylketones, propiophenones, benzophenones, α-hydroxyketones, fluorenylphosphine oxides and the like. The initiator can be used alone or together.

In another embodiment of the present invention, the hard coating solution can be optionally added with an antistatic agent, a colorant, a flame retardant, a UV absorber, an antioxidant, a surface modifier and the like.

In another embodiment of the present invention, the hard coating layer can be optionally coated with a low refractive solution thereon to form a low refractive layer so as to obtain an anti-reflective hard coating film with a property of anti-reflection. The refractive index of the low refractive layer is lower than that of the base film or the hard coating layer. The low refractive layer on the hard coating layer can comprises a binder resin, hollow silica nanoparticles, an initiator and a leveling agent, wherein the leveling agent comprises a perfluoropolyether group-containing (meth) acrylic-modified organosilicone.

The binder resin suitably used in the low refractive layer can be a (meth)acrylate, for example, but not limited to, selected from at least one of the group consisting of pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, ditrimethylolpropane tetra(meth)acrylate and dipentaerythritol tetra(meth)acrylate, or the combinations thereof.

The hollow silica nanoparticles in the low refractive layer are used to enhance the film strength and lower the refractivity thereof. The term "hollow silica nanoparticles" used herein is directed to a structure with air cavities and/or a porous structure. In an embodiment of the present invention, the average particle diameter of the hollow silica nanoparticles is ranging between 50 nm and 100 nm, and preferably ranging between 50 nm and 80 nm. The content of the hollow silica nanoparticles is ranging from 60 weight parts to 130 weight parts relative to 100 weight parts of the binder resin, and preferably ranging from 80 weight parts to 110 weight parts relative to 100 weight parts of the binder resin.

The leveling agent used in the low reflective layer is a perfluoropolyether group-containing (meth)acrylic-modified organosilicone compound represented by the following formula (I) or a compound represented by the following formula (II):

Formula (I)

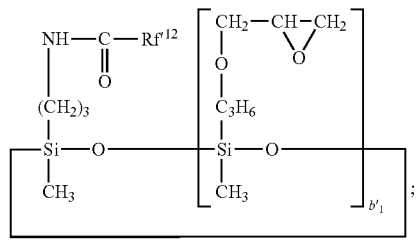

Formula (II)

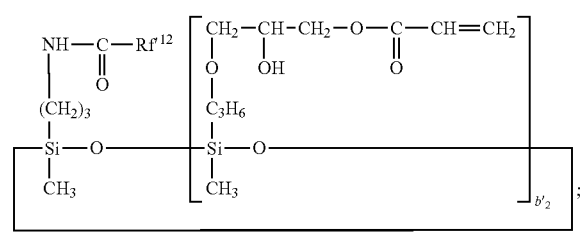

wherein $b'_1 + b'_2$ is ranging between 2 and 6.5, and $Rf'^{12}$ is represented by the following formula:

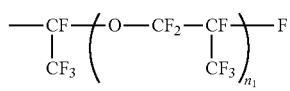

wherein n1 is ranging between 2 and 100.

The number average molecular weight of the perfluoropolyether group-containing (meth)acrylic-modified organosilicone compound is ranging between 1,500 and 16,000, and preferably ranging between 3,500 to 7,000. The amount of the leveling agent comprising perfluoropolyether group-containing (meth)acrylic-modified organosilicone compound used in the low reflective layer is ranging from 5 weight parts to 20 weight parts relative to per 100 weight parts of (meth)acrylate resin, and preferably ranging from 8 weight parts to 17 weight parts. When the content of the leveling agent comprising the perfluoropolyether group-containing (meth)acrylic-modified organosilicone compound is excess of insufficient, it will have adverse effect on the abrasion resistance of the anti-reflective film.

The initiator suitably used in the low reflective layer of the present invention can be the initiators commonly used in the related art, such as, but not limited to, for example, selected from at least one of the group consisting of hydroxycyclohexy phenyl ketone, diphenyl(2,4,6-trimethylbenzoyl)phosphine oxide, 2-hydroxy-2-methyl-1 phenyl propanone, 2-methyl-1-[4-(methylthio)phenyl]-2-morpholinopropane-1-one, oligo[2-hydroxy-2-methyl-1-[4-(1-methylvinyl)phenyl]propanone] and 2-hydroxy-1-[4-[4-(2-hydroxy-2-methylpropanoyl)phenoxy]phenyl]-2-methylpropan-1-one, or the combinations thereof. In an embodiment of the present invention, the amount of the initiator used in the reflective film is ranging from 1.5 weight parts to 20 weight parts relative to per 100 weight parts of the (meth)acrylate resin, and preferably ranging from 2 weight parts to 17 weight parts. When the content of initiator is excess or insufficient, it will have adverse effect on the abrasion resistance of the anti-reflective film.

The hard coating film of the present invention can further be used as a functional film. In an embodiment of the present invention, the hard coating layer can further be incorporated into particles to be performed as an antiglare hard coating. The incorporated particles can be for example, organic microparticles and silica nanoparticles to make an irregular rough surface for achieving an antiglare property.

In an embodiment of the present invention, the silica nanoparticles suitable incorporated into the hard coating have a primary particle diameter ($d_{50}$) of 5 nm to 30 nm and a secondary particle diameter ($d_{50}$) of 50 nm to 120 nm. In an embodiment of the present invention, the amount of the silica nanoparticles used in the hard coating layer is ranging from 0.2 weight percent (wt %) to 12 weight percent (wt %) and preferably ranging from 0.2 weight percent (wt %) to 8 weight percent (wt %).

In an embodiment of the present invention, the particle diameter of the organic microparticles incorporated into the antiglare hard coating is less than 5 μm and preferably ranging between 1 μm and 5 μm. The suitable organic microparticles are the hydrophilic-modified polymethyl methacrylate microparticles, polystyrene microparticles, styrene-methyl methacrylate copolymer microparticles, polyethylene microparticles, epoxy resin microparticles, polysilicone microparticles, polyvinylidene fluoride or polyvinyl fluoride microparticle. The surface of the organic microparticles can be hydrophilic-modified by 2-hydroxyethyl (meth)acrylate (2-HE(M)A) or (meth)acrylonitrile. In a preferred embodiment of the present invention, it is preferred to use hydrophilic-modified polymethyl methacrylate microparticles, polystyrene microparticles, or styrene-methyl methacrylate copolymer microparticles. Furthermore, the amount of the organic microparticles used in the hard coating layer will affect the anti-glare property thereof, the amount of the organic microparticles used in the antiglare hard coating is ranging between 0.3 wt % and 2 wt % and preferably ranging between 0.7 wt % and 1.8 wt %.

The present antiglare hard coating layer can optionally be incorporated with a re-coatable fluorine, (meth)acrylate or an organosilicone leveling agent. The leveling agent incorporated into antiglare hard coating layer is for enhancing the surface coverage and smoothness of the coating layer and thus, the surface of the low reflective layer obtained after drying can be a smooth one with antifouling and abrasion resistance. The leveling agent suitably used in the present antiglare hard coating layer can be such as, polyether-modified silicone, polyether-modified acrylate, fluorine-containing acrylate or perfluoroalkyl fluoride surfactant and the like. In an embodiment of the present invention, the amount of leveling agent in the coating layer is ranging between 0.25 weight percent to 1.50 weight percent and is preferably between 0.45 weight percent and 1.05 weight percent. The amount of the leveling agent is out of the above range, the abrasion resistance of the antiglare hard coating layer will be adversely affected.

In an embodiment of the present invention, the hard coating incorporating organic microparticles and silica nanoparticles can keep the excellent adhesion between the hard coating layer and the PMMA base film and provide a satisfied abrasion resistance. In the surface of the present antiglare hard coating film, the mean spacing between peaks (Sm) is ranging between 20 µm and 50 µm, the arithmetic mean deviation of surface (Ra) is ranging between 0.03 µm to 0.09 µm, the largest peak to valley height (Ry) is ranging between 0.25 µm and 0.60 µm, the ten-point mean roughness (Rz) is ranging between 0.15 µm and 0.50 µm and the root mean square slope (P$\Delta$q) is ranging between 0.5° and 1.6°. In the surface roughness of a preferred embodiment of the present antiglare hard coating, the mean spacing between peaks (Sm) is preferably between 25 µm and 45 µm, the arithmetic mean deviation of surface (Ra) is preferably between 0.03 µm to 0.08 µm, the largest peak to valley height (Ry) is preferably between 0.28 µm and 0.55 µm, the ten-point mean roughness (Rz) is preferably between 0.20 µm and 0.45 µm and the root mean square slope (P$\Delta$q) is ranging between 0.7° and 1.4°. If the value of surface roughness is too low, the abrasion resistance will decrease. If the value of the surface roughness is higher and the slope of the concavities and convexities in surface is too steep (higher slope angle), the surface is susceptible to be scratched. Thus, an adequate surface roughness can enhance the abrasion resistance of the antiglare hard coating. The present antiglare hard coating film with the adequate arithmetic mean deviation of surface, largest peak to valley roughness, ten-point mean roughness, mean spacing between peaks and root mean square slope (slope angle) provides a satisfied abrasion resistance.

The antiglare hard coating film can be further optionally coated with an above-mentioned low refractive layer to obtain an anti-reflective antiglare hard coating film. The present antiglare hard coating film is coated with a low refractive layer to provide the anti-reflective property without lowering the abrasion resistance of the film surface. In an embodiment of the present invention, the surface roughness of the anti-reflective antiglare hard coating film has a mean spacing between peaks (Sm) of between 20 µm and 90 µm, an arithmetic mean deviation of surface (Ra) of between 0.03 µm to 0.07 µm, a largest peak to valley height (Ry) of between 0.15 µm and 0.40 µm, a ten-point mean roughness (Rz) of between 0.10 µm and 0.50 µm. In a preferred embodiment of the parent invention, the surface roughness of the anti-reflective antiglare hard coating film has a mean spacing between peaks (Sm) of between 30 µm and 80 µm, an arithmetic mean deviation of surface (Ra) of between 0.035 µm to 0.060 µm, a largest peak to valley height (Ry) of between 0.16 µm and 0.25 µm, a ten-point mean roughness (Rz) of between 0.20 µm and 0.40 µm.

The method for preparing the hard coating film of the present invention comprises the steps of mixing a (meth)acrylate composition comprises a urethane (meth)acrylate oligomer with a functionality of 6 to 15, at least one (meth)acrylate monomer with a functionality of 3 to 6, at least one (meth)acrylate monomer with functionality of less than 3, an initiator and adequate solvent(s) and stirred evenly for preparing a hard coating solution; optionally adding a leveling agent into the hard coating solution; and coating the hard coating solution on the PMMA base film, evaporating the solvent(s) and curing by radiation or electron beam for forming a hard coating on the PMMA base film to obtain a hard coating film.

The present hard coating film can be further coated with a low refractive layer. The low refractive layer is prepared by mixing and stirring a binder resin, hollow silica nanoparticles, an initiator, a leveling agent comprising a perfluoropolyether group-containing (meth)acrylic-modified organosilicone as above and an adequate solvent(s) to make a low refractive solution; coating the low refractive solution on the hard coating layer, evaporating the solvent(s) and curing the coating layer by radiation or electron beam for forming a low refractive layer on the hard coating layer to obtain an anti-reflective hard coating film.

The present hard coating film can be further prepared to form an antiglare hard coating film. The method for preparing the antiglare hard coating film comprises the steps pf mixing and stirring a (meth)acrylate composition comprising a urethane (meth)acrylate oligomer with a functionality of 6 to 15, at least one (meth)acrylate monomer with a functionality of 3 to 6, at least one (meth)acrylate monomer with functionality of less than 3, an initiator, a leveling agent, organic microparticles, silica nanoparticles and suitable solvent(s) to prepare an antiglare hard coating solution; and coating the antiglare hard coating solution on a PMMA base film, evaporating to remove the solvent(s), radiation-curing or electron beam-curing the coating layer to form an antiglare hard coating layer on the PMMA base film to obtain a antiglare hard coating film.

The present antiglare hard coating film can be further coated with a low refractive layer to obtain an anti-reflective antiglare hard coating film. The low refractive layer is prepared by mixing a binder resin, hollow silica nanoparticles, an initiator, a leveling agent comprising a perfluoropolyether group-containing (meth)acrylic-modified organosilicone and suitable solvent(s) to obtain a low refractive solution; coating the low refractive solution on the antiglare hard coating layer; and evaporating the solvent, radiation-curing or electron beam curing the coating layer to form a low refractive layer on the antiglare hard coating film.

The solvents suitable for preparation of the present hard coating, the antiglare hard coating, the low refractive layer can be the organic solvents commonly used in the related art, such as ketones, aliphatic, cycloaliphatic or aromatic hydrocarbons, ethers, esters or alcohols. The hard coating solution and the low refractive solution can use one or one more organic solvents. The suitable solvent can be such as, acetone, butanone, cyclohexanone, methyl isobutyl ketone, hexane, cyclohexane, dichloromethane, dichloroethane, toluene, xylene, propylene glycol methyl ether, methyl acetate, ethyl acetate, propyl acetate, butyl acetate, n-butanol, isobutanol, isopropanol, diacetone alcohol, propylene glycol methyl ether acetate, cyclohexanol or tetrahydrofuran and the like.

The hard coating solution, antiglare hard coating solution and the low refractive solution can be applied to the base film surface by any usual method in the related art, for example, bar coating, doctor blade coating, dip coating, roll coating, spinning coating, slot-die coating and the like.

The further object of the present invention is to provide a polarizer comprising a polarizing element, wherein the surface of the polarizer comprises the present hard coating film, the present anti-reflective hard coating film, the present antiglare hard coating film or the anti-reflective antiglare hard coating film.

A yet further object of the present invention is to provide a display comprising the present hard coating film, the present anti-reflective hard coating film, the present antiglare hard coating film or the anti-reflective antiglare hard coating film and/or a polarizer as above on the surface of the display.

The present invention will be described below with reference to Examples to describe the present invention in detail but the present invention is not limited to the description thereof.

EXAMPLE

Example 1: Preparation of the Hard Coating Film 39 weight parts of urethane acrylate oligomer (functionality 6, molecular weight of about 1,520, viscosity of 25,000 cps (at 25° C.), commercially obtained from Miwon, Korea), 4.5 weight parts of PETA, 12 weight parts of DPHA, 6 weight parts of HDDA, 4 weight parts of photoinitiator (Chemcure-481, commercially obtained from Chembridge, Taiwan), 24.5 weight parts of ethyl acetate and 75 weight parts of n-butyl acetate were mixed and stirred for 1 hour to prepare a hard coating solution. The hard coating solution was coated on a PMMA base film with a thickness of 40 μm, and then, the coating film was dried at 90° C. oven for 30 seconds and cured by exposing to UV light in a cumulative dosage of 40 mJ/cm$^2$ under nitrogen atmosphere to obtain a hard coating film with a thickness of 5 μm formed on the PMMA base film. The optical properties, hardness and abrasion resistance of the obtained hard coating film were determined and the adhesion between the hard coating layer and the PMMA base film was also determined. The results were shown in Table 1.

Example 2: Preparation of the Hard Coating Film 39 weight parts of urethane acrylate oligomer (functionality 15, molecular weight about 3,600, viscosity of 4,700 cps (at 60° C., commercially obtained from Chemton, Korea), 4.5 weight parts of PETA, 12 weight parts of DPHA, 6 weight parts of HDDA, 4 weight parts of photoinitiator (Chemcure-481, commercially obtained from Chembridge, Taiwan), 24.5 weight parts of ethyl acetate and 75 weight parts of n-butyl acetate were mixed and stirred for 1 hour to prepare a hard coating solution. The hard coating solution was coated on a PMMA base film with thickness of 40 μm, and then, the coating film was dried at 90° C. oven for 30 seconds and cured by exposing to UV light in a cumulative dosage of 40 mJ/cm$^2$ under nitrogen atmosphere to obtain a hard coating film with a thickness of 5 μm formed on the PMMA base film. The optical properties, hardness and abrasion resistance of the obtained hard coating film were determined, and the adhesion between the hard coating layer and the PMMA base film was also determined. The results were shown in Table 1.

Example 3: Preparation of the Hard Coating Film 39 weight parts of urethane acrylate oligomer (functionality 9, molecular weight about 2,000, viscosity of about 86,000 cps (at 25° C.), commercially obtained from Allnex, USA), 4.5 weight parts of PETA, 12 weight parts of DPHA, 6 weight parts of CTFA, 4 weight parts of photoinitiator (Chemcure-481, commercially obtained from Chembridge, Taiwan), 24.5 weight parts of ethyl acetate and 75 weight parts of n-butyl acetate were mixed and stirred for 1 hour to prepare a hard coating solution. The hard coating solution was coated on a PMMA base film with a thickness of 40 μm, and then, the coating film was dried at 90° C. oven for 30 seconds and cured by exposing to UV light in a cumulative dosage of 40 mJ/cm$^2$ under nitrogen atmosphere to obtain a hard coating film with a thickness of Sum formed on the PMMA base film. The optical properties, hardness and abrasion resistance of the obtained hard coating film were determined and the adhesion between the hard coating layer and the PMMA base film was also determined. The results were shown in Table 1

Example 4: Preparation of the Hard Coating Film 39 weight parts of urethane acrylate oligomer (functionality 9, molecular weight about 2,000, viscosity of about 86,000 cps (at 25° C.), commercially obtained from Allnex, USA), 4.5 weight parts of PETA, 12 weight parts of DPHA, 6 weight parts of PHEA, 3.5 weight parts of photoinitiator (Chemcure-481, commercially obtained from Chembridge, Taiwan), 0.5 weight parts of photoinitiator (TR-PPI-one, commercially obtained from Tronly New Electronic Materials, Hong Kong), 24.5 weight parts of ethyl acetate and 75 weight parts of n-butyl acetate were mixed and stirred for 1 hour to prepare a hard coating solution. The hard coating solution was coated on a PMMA base film with a thickness of 40 μm, and then, the coating film was dried at 90° C. oven for 30 seconds and cured by exposing to UV light in a cumulative dosage of 40 mJ/cm$^2$ under nitrogen atmosphere to obtain a hard coating film with a thickness of Sum formed on the PMMA base film. The optical properties, hardness and abrasion resistance of the obtained hard coating film were determined and the adhesion between the hard coating layer and the PMMA base film was also determined. The results were shown in Table 1.

Example 5: Preparation of the Hard Coating Film 39 weight parts of urethane acrylate oligomer (functionality 9, molecular weight about 2,000, viscosity of about 86,000 cps (at 25° C.), commercially obtained from Allnex, USA), 4.5 weight parts of PETA, 12 weight parts of DPHA, 6 weight parts of HDDA, 3.5 weight parts of photoinitiator (Chemcure-481, commercially obtained from Chembridge, Taiwan), 0.5 weight parts of photoinitiator (TR-PPI-one, commercially obtained Tronly New Electronic Materials, Hong Kong), 24.5 weight parts of ethyl acetate and 75 weight parts of n-butyl acetate were mixed and stirred for 1 hour to prepare a hard coating solution. The hard coating solution was coated on a PMMA base film with a thickness of 40 μm, and then, the coating film was dried at 90° C. oven for 30 seconds and cured by exposing to UV light in a cumulative dosage of 40 mJ/cm² under nitrogen atmosphere to obtain a hard coating film with a thickness of 5 μm formed on the PMMA base film. The optical properties, hardness and abrasion resistance of the obtained hard coating film were determined and the adhesion between the hard coating layer and the PMMA base film was also determined. The results were shown in Table 1.

Example 6: Preparation of the Hard Coating Film 40.5 weight parts of urethane acrylate oligomer (functionality 9, molecular weight about 2,000, viscosity of about 86,000 cps (at 25° C.), commercially obtained from Allnex, USA), 4.5 weight parts of PETA, 10.5 weight parts of DPHA, 4.5 weight parts of HDDA, 1.5 weight parts of PHEA, 3.5 weight parts of photoinitiator (Chemcure-481, commercially obtained from Chembridge, Taiwan), 5 weight parts of photoinitiator (TR-PPI-one, commercially obtained from Tronly New Electronic Materials, Hong Kong), 24.5 weight parts of ethyl acetate and 75 weight parts of n-butyl acetate were mixed and stirred for 1 hour to prepare a hard coating solution. The hard coating solution was coated on a PMMA base film with a thickness of 40 μm, and then, the coating film was dried at 90° C. oven for 30 seconds and cured by exposing to UV light in a cumulative dosage of 40 mJ/cm² under nitrogen atmosphere to obtain a hard coating film with a thickness of 5 μm formed on the PMMA base film. The optical properties, hardness and abrasion resistance of the obtained hard coating film were determined and the adhesion between the hard coating layer and the PMMA base film was also determined. The results were shown in Table 1.

Property Measurement

The optical properties of the hard coating films obtained from the Examples were measured according to JIS test methods, wherein the haze was measured according to the test method of JIS K7136 by NDH-2000 Haze Meter (manufactured by Nippon Denshoku Industries, Japan), and the light transmittance was measured according to the test method of JIS K7361 by NDH-2000 Haze Meter (manufactured by Nippon Denshoku Industries, Japan).

The films obtained from the Examples were conducted the hardness measurement as determined by the pencil hardness test in accordance with JIS K 5400 using Mitsubishi 2H pencils.

The hard coating films obtained from the Examples were conducted the abrasion resistance measurement. The surface of the hard coating film was rubbed by a steel wood #0000 with various loads (g/cm²) at a speed of 60 rpm for 10 times. The rubbing load was increased to rub the surface of the hard coating film. The maximum load with no scratch observed on the film surface was recorded.

The hard coating films obtained from the Examples were conducted the adhesion test. The adhesion was tested by the cross-cut test according to JIS K 5600-5-6 to measure the adhesion between the hard coating and the PMMA base film.

TABLE 1

The properties of the hard coating films of Examples 1 to 6

| | Haze (%) | Light Transmittance (%) | Hardness | Abrasion Resistance (g) | Adhesion |
|---|---|---|---|---|---|
| Example 1 | 0.88 | 92.03 | 2H | 200 | 100/100 |
| Example 2 | 0.77 | 92.06 | 2H | 500 | 100/100 |
| Example 3 | 0.76 | 91.94 | 2H | 600 | 100/100 |

TABLE 1-continued

The properties of the hard coating films of Examples 1 to 6

| | Haze (%) | Light Transmittance (%) | Hardness | Abrasion Resistance (g) | Adhesion |
|---|---|---|---|---|---|
| Example 4 | 0.81 | 91.97 | 2H | 400 | 100/100 |
| Example 5 | 0.80 | 92.04 | 2H | 900 | 100/100 |
| Example 6 | 0.76 | 92.11 | 2H | 600 | 100/100 |

As the results shown in Table 1, the hard coating films comprising a PMMA base film obtained from Examples 1 to 6 have excellent adhesion between the hard coating layer and the PMMA base film. The hardness and abrasion resistance hard of the hard coating films are all satisfied and the haze and light transmittance thereof are suitable for display devices.

Example 7: Preparation of Anti-Reflective Hard Coating Film 91.25 weight parts of PETA, 8.75 weight parts of photoinitiator (KIP-160, commercially obtained from IGM Resin, Netherland), 45 weight parts of a perfluoropolyether group-containing (meth)acrylic-modified organosilicone (KY-1203, solid content 20%, solvent: methyl isobutyl ketone, commercially obtained from Shin-Etsu Chemical, Japan), 438 weight parts of hollow silica nanoparticles dispersion (Thrulya 4320, solid content 20%, average particle diameter 60 nm, solvent: methyl isobutyl ketone, commercially obtained from JGC Catalysts and Chemicals, Japan), 200 weight parts of ethyl acetate, 200 weight parts of n-butyl acetate, 3442 weight parts of methyl isobutyl ketone and 5365 weight parts of propylene glycol methyl ether were mixed and stirred for 10 minutes to prepare a low refractive solution.

The low refractive solution was coated on the hard coating layer of the hard coating film of Example 3, and then, the coating film was dried at 80° C. oven for 2 minutes and cured by exposing to UV light in a cumulative dosage of 350 mJ/cm² under nitrogen atmosphere to obtain a hard coating film comprising a low refractive layer with a thickness of 0.13 μm formed on the hard coating layer to obtain an anti-reflective hard coating film.

The optical properties of the obtained anti-reflective hard coating film were determined by the measurements as Example 1, wherein the haze was measured as 0.78% and the light transmittance was measured as 94.73%.

This anti-reflective hard coating was determined the reflectivity measurement. The obtained anti-reflective hard coating film was adhered to a black sheet and subjected to a reflectivity measurement by means of a spectrophotometer (model: U-4100, manufactured by Hitachi, Ltd.) at the wavelength of 380-780 nm, wherein the reflectivity was measured as 1.36%.

The anti-reflective hard coating film was also conducted the abrasion resistance measurement. The surface of the low refractive layer of the anti-reflective hard coating film was rubbed by a steel wood #0000 with a load of 500 g/cm² for 10 times and checked if any scratch was observed. The surface of the low refractive layer of this anti-reflective hard coating film was observed no scratches under a rub load of 500 g/cm². The obtained anti-reflective hard coating film has excellent abrasion resistance.

Example 8: Preparation of the Anti-Reflective Hard Coating Film 97.75 weight parts of PETA, 2.25 weight parts of photoinitiator (KIP-160, commercially obtained from IGM Resin, Netherland), 45 weight parts of a perfluoropolyether group-containing (meth)acrylic-modified organosilicone (KY-1203, solid content 20%, solvent: methyl isobutyl ketone, commercially obtained from Shin-Etsu Chemical, Japan), 438 weight parts of hollow silica nanoparticles dispersion (Thrulya 4320, solid content 20%, average particle diameter 60 nm, solvent: methyl isobutyl ketone, commercially obtained from JGC Catalysts and Chemicals, Japan), 200 weight parts of ethyl acetate, 200 weight parts of n-butyl acetate, 3442 weight parts of methyl isobutyl ketone and 5365 weight parts of propylene glycol methyl ether were mixed and stirred for 10 minutes for a low refractive solution.

The low refractive solution was coated on the hard coating layer of the hard coating film of Example 5. The coated low refractive layer was dried at 80° C. oven for 2 minutes and cured by exposing to UV light in a cumulative dosage of 350 mJ/cm$^2$ under nitrogen atmosphere. A 0.13 µm low refractive layer was formed on the anti-reflective hard coating film.

The anti-reflective hard coating film was conducted the optical properties measurements as Example 1, wherein the haze was measured as 0.84% and the light transmittance was measured as 94.59%.

This anti-reflective hard coating was determined the reflectivity measurement. The obtained anti-reflective hard coating film was adhered to a black sheet and subjected to a reflectivity measurement by means of a spectrophotometer (model: U-4100, manufactured by Hitachi, Ltd.) at the wavelength of 380-780 nm, wherein the reflectivity was measured as 1.38%.

The anti-reflective hard coating film was conducted abrasion resistance measurement. The surface of the low refractive layer of the anti-reflective hard coating film was rubbed by a steel wood #0000 with a load of 500 g/cm$^2$ for 10 times and checked if any scratch was observed. The surface of the low refractive layer of this anti-reflective hard coating film was observed no scratch under a rub load of 500 g/cm$^2$. The obtained anti-reflective hard coating film has excellent abrasion resistance.

Example 9: Preparation of the Anti-Reflective Antiglare Hard Coating Film 300 weight parts of hard coating solution prepared in Example 4, 5.45 weight parts of reactive silica nanoparticles dispersion (MEK-5630X, solid content 30%, solvent: butanone, commercially obtained from EUSIL, Taiwan), 2.55 weight parts of hydrophobic silica nanoparticles dispersion (NanoBYK-3650, solid content 30%, solvent: propylene glycol monomethyl ether acetate/propylene glycol methyl ether, commercially obtained from BYK, Germany), 3.27 weight parts of organic microparticles (SSX-A02RRE, hydrophilic-modified methyl methacrylate-styrene copolymer particles, average particle diameter of 2.0 µm, refractive index 1.55, commercially obtained from Sekisui Plastics, Japan), 15.4 weight parts of acrylate leveling agent (BYK-UV3535, solid content 10%, solvent: ethyl acetate, commercially obtained from BYK, Germany), 108.6 weight parts of ethyl acetate and 141.3 weight parts of n-butyl acetate were mixed and stirred for 1 hour to evenly disperse and prepare an antiglare hard coating solution. The antiglare hard coating solution was coated on a PMMA base film with a thickness of 40 µm and then, the coating film was dried and cured by exposing to UV light in a cumulative dosage of 89 mJ/cm$^2$ under nitrogen atmosphere to obtain an antiglare hard coating film with a thickness of 4 µm formed on the PMMA base film.

The haze and light transmittance of the obtained antiglare hard coating film were determined as the tests of Example 1. The results were shown in Table 2.

The antiglare hard coating film was conducted glossiness, clarity measurement and glare evaluation. The glossiness measurement was conducted by adhering the antiglare hard coating film to a black sheet and measuring the gloss at an angle of 20° by BYK micro-Gloss meter according to JIS Z 8741. The clarity measurement was conducted by cutting the antiglare hard coating film into 5×8 cm$^2$ and using an image clarity meter SUGA ICM-IT according to JIS K 7374 to measure the value at the grating with the width of 0.125 mm, 0.25 mm, 0.50 mm, 1.00 mm and 2.00 mm and calculate the total value. Glare evaluation was conducted by adhering the antiglare hard coating film to a black sheet, setting the laminated film before a fluorescent lamp and visual-observing if the fluorescent image was blurring according to the criteria: "X": strong glare, "○": mildly glare, "☉": no glare. The antiglare evaluations of the antiglare hard coating film prepared in the Examples were listed in Table 2. Surface roughness test is use the Surface Measuring Instrument (CS-H5000CNC, commercially obtained from Mitutoyo) or 3D microscope (µsurf mobile, commercially obtained from NanoFocus) to determine the arithmetic mean deviation of surface (Ra), the ten-point mean roughness (Rz), the largest peak to valley height (Ry), the mean spacing between peaks (Sm) and the root mean square slope (PΔq). The results were showed in Table 2.

The low refractive solution prepared in Example 7 was coated on the antiglare hard coating layer of the antiglare hard coating film. The coated low refractive layer was dried at 80° C. oven for 2 minutes and cured by exposing to UV light in a cumulative dosage of 350 mJ/cm$^2$ under nitrogen atmosphere. A low refractive layer with a thickness of 0.13 µm was formed on the anti-reflective hard coating film to obtain an anti-reflective antiglare hard coating film.

The anti-reflective antiglare hard coating film was conducted the haze, light transmittance, reflectivity, surface roughness measurements as the previous Examples. The results were listed in Table 3.

The anti-reflective antiglare film was conducted the abrasion resistance measurement under the loads of 500 g/cm$^2$ and 1000 g/cm$^2$. The results were listed in Table 3.

Example 10: Preparation of the Anti-Reflective Antiglare Hard Coating Film

An antiglare film was prepared by the procedures same as in Example 9, except that the hard coating solution was replaced by the hard coating solution of Example 6.

The antiglare hard coating film was conducted the haze, light transmittance, glossiness, clarity and surface roughness measurements and antiglare evaluation. The results were listed in Table 2.

The antiglare hard coating layer of this antiglare hard coating film was further coated with the low refractive layer solution prepared in Example 7 to obtain an anti-reflective antiglare hard coating film. This anti-reflective antiglare hard coating film was conducted again a surface roughness measurement, haze and light transmittance measurements. The results were listed in Table 3.

The anti-reflective antiglare film was conducted the abrasion resistance measurement under the loads of 500 g/cm$^2$ and 1000 g/cm$^2$. The results were listed in Table 3.

Example 11: The Preparation of the Anti-Reflective Antiglare Hard Coating Film 300 weight parts of the hard coating solution obtained from Example 6, 13.8 weight parts of reactive silica nanoparticles dispersion (MEK-5630X, solid content 30%, solvent: butanone, commercially obtained from EUSIL, Taiwan), 2.46 weight parts of organic microparticles (SSX-A02RFE, hydrophilic-modified methyl methacrylate-styrene copolymer particles, average particle diameter of 2.0 μm, refractive index 1.55, commercially obtained from Sekisui Plastics, Japan), 15.5 weight parts of re-coatable acrylate leveling agent (BYK-UV3535, solid content 10%, solvent: ethyl acetate, commercially obtained from BYK, Germany), 0.88 weight parts of dispersion agent (DisperBYK-2150, solid content 2%, solvent: ethyl acetate/propylene glycol monomethyl ether acetate, commercially obtained from BYK, Germany), 40.5 weight parts of ethyl acetate, 70.5 weight parts of n-butyl acetate and 70.5 weight parts of iso-butyl alcohol were mixed and stirred for 1 hour for evenly dispersion to prepare an antiglare hard coating solution. The antiglare hard coating solution was coated on a PMMA base film with a thickness of 40 μm and then, the coating film was dried and cured by exposing to UV light in a cumulative dosage of 89 mJ/cm$^2$ under nitrogen atmosphere to obtain an antiglare hard coating film with a thickness of 4 μm formed on the PMMA base film.

The obtained antiglare hard coating film was conducted haze, light transmittance, glossiness and clarity measurements and glare evaluation. The results were shown in Table 2.

The low refractive solution prepared in Example 7 was coated on the antiglare hard coating layer of the antiglare hard coating film to provide a low refractive layer on the antiglare hard coating layer for preparing an anti-reflective antiglare hard coating film. This anti-reflective antiglare film was conducted the surface roughness measurement, haze and light transmittance measurement. The obtained results were listed in Table 3.

The anti-reflective antiglare film was conducted the abrasion resistance measurement under the loads of 500 g/cm$^2$ and 1000 g/cm$^2$. The results were listed in Table 3.

Example 12: Preparation of the Anti-Reflective Antiglare Hard Coating Film 300 weight parts of the hard coating solution obtained from Example 6, 2.73 weight parts of reactive silica nanoparticles dispersion (MEK-5630X, solid content 30%, solvent: butanone, commercially obtained from EUSIL, Taiwan), 2.55 weight parts of hydrophobic silica nanoparticles dispersion (NanoBYK-3650, solid content 30%, solvent: propylene glycol monomethyl ether acetate/propylene glycol methyl ether, commercially obtained from BYK, Germany), 3.27 weight parts of organic microparticles (SSX-A02RFE, hydrophilic-modified methyl methacrylate-styrene copolymer particles, average particle diameter of 2.0 μm, refractive index 1.55, commercially obtained from Sekisui Plastics, Japan), 15.4 weight parts of acrylate leveling agent (BYK-UV3535, solid content 10%, solvent: ethyl acetate, commercially obtained from BYK, Germany), 108.7 weight parts of ethyl acetate and 141.3 weight parts of n-butyl acetate were mixed and stirred for 1 hour to evenly disperse and prepare an antiglare hard coating solution. The antiglare hard coating solution was coated on a PMMA base film with a thickness of 40 μm and then, the coating film was dried and cured by exposing to UV light in a cumulative dosage of 89 mJ/cm$^2$ and an intensity of 380 mW/cm$^2$ under nitrogen atmosphere to obtain an antiglare hard coating film with a thickness of 4 μm formed on PMMA base film to obtain an antiglare hard coating film.

The antiglare hard coating film was conducted the glossiness and clarity measurements, the glare evaluation and the surface roughness measurement. The results were listed in Table 2.

The low refractive solution prepared in Example 7 was coated on the antiglare hard coating layer of the antiglare hard coating film to provide a low refractive layer on the antiglare hard coating layer for preparing an anti-reflective antiglare hard coating film. This anti-reflective antiglare film was conducted the surface roughness measurement, the haze and light transmittance measurements. The obtained results were listed in Table 3.

The anti-reflective antiglare film was conducted the abrasion resistance measurement under the loads of 500 g/cm$^2$ and 1000 g/cm$^2$. The results were listed in Table 3.

TABLE 2

The optical properties and surface roughnesses of the antiglare hard coating films obtained from Examples 9 to 12

| | Haze (%) | Light Transmittance (%) | Glossiness @ 20° (%) | Clarity (%) | Antiglare | Ra (μm) | Rz (μm) | Ry (μm) | Sm (μm) | PΔq (°) |
|---|---|---|---|---|---|---|---|---|---|---|
| Example 9 | 3.68 | 91.82 | 38.3 | 430.7 | ⊚ | 0.071 | 0.377 | 0.533 | 30.0 | 1.35 |
| Example 10 | 3.62 | 91.89 | 71.6 | 430.6 | ⊚ | 0.055 | 0.427 | 0.523 | 33.0 | 1.38 |
| Example 11 | 3.03 | 91.96 | 71.0 | 414.8 | ⊚ | 0.035 | 0.242 | 0.286 | 36.2 | 0.71 |
| Example 12 | 3.59 | 91.89 | 42.5 | 427.8 | ⊚ | 0.059 | 0.277 | 0.394 | 42.0 | 0.70 |

TABLE 3

The optical properties, surface roughnesses and abrasion resistance of the
anti-reflective antiglare hard coating films obtained from Examples 9 to 2

| | Haze (%) | Light Transmittance (%) | R [%] | Ra (μm) | Rz (μm) | Ry (μm) | Sm (μm) | Abrasion Resistance 500 g | Abrasion Resistance 1000 g |
|---|---|---|---|---|---|---|---|---|---|
| Example 9 | 3.40 | 94.3 | 1.27 | 0.046 | 0.321 | 0.218 | 43.8 | ◎ | ◎ |
| Example 10 | 3.22 | 94.7 | 1.25 | 0.049 | 0.292 | 0.168 | 73.7 | ◎ | ◎ |
| Example 11 | 2.83 | 94.7 | 1.32 | 0.037 | 0.240 | 0.203 | 48.1 | ◎ | ◎ |
| Example 12 | 3.28 | 94.4 | 1.28 | 0.047 | 0.317 | 0.198 | 53.3 | ◎ | ◎ |

As shown in Tables 1, 2 and 3, the hard coating films, the anti-reflective hard coating films, the antiglare hard coating films and the anti-reflective antiglare hard coating films of the present invention exhibit an excellent adhesion between the hard coating layer and the PMMA base film and good abrasion resistance on the film surface thereof. The hard coating films, the anti-reflective hard coating films, the antiglare hard coating films and the anti-reflective antiglare hard coating films of the present invention also exhibit good optical properties.

According to the above-disclosed the hard coating film, the anti-reflective hard coating film, the antiglare hard coating film and the anti-reflective antiglare hard coating film disclosed, the present invention is further to provide a polarizer comprising a polarizing element, wherein the polarizer comprises the present hard coating film, the present anti-reflective hard coating film, the present antiglare hard coating film or the present anti-reflective antiglare hard coating film as above thereon.

According to the above-disclosed the hard coating film, the anti-reflective hard coating film, the antiglare hard coating film and the anti-reflective antiglare hard coating film disclosed, the present invention is yet further to provide a display comprising the polarizer comprises the present hard coating film, the present anti-reflective hard coating film, the present antiglare hard coating film, the present anti-reflective antiglare hard coating film, or the present polarizer thereon on the surface of the display.

While the invention has been described by way of example(s) and in terms of the embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hard coating film comprising a polymethyl methacrylate (PMMA) base film and an antiglare hard coating layer formed thereon, wherein the antiglare hard coating layer is formed by coating a curable mixture including a (meth)acrylate composition, an initiator, silica nanoparticles, organic microparticles and a leveling agent on the PMMA base film and curing thereafter, and the (meth)acrylate composition comprises:
    a urethane (meth)acrylate oligomer with a functionality of 6 to 15 and a molecular weight ranging between 1,000 and 4,500;
    at least one (meth)acrylate monomer with a functionality of 3 to 6;
    and at least one (meth)acrylate monomer with functionality of less than 3;
    wherein the antiglare hard coating layer is a single layer; and
    wherein the antiglare hard coating layer has a mean spacing between peaks (Sm) of between 20 μm and 50 μm, an arithmetic mean deviation of surface (Ra) of between 0.03 μm to 0.09 μm, a largest peak to valley height (Ry) of between 0.25 μm and 0.60 μm, a ten-point mean roughness (Rz) of between 0.15 μm and 0.50 μm and a root mean square slope (PΔq) of between 0.50° and 1.60°.

2. The hard coating film as claimed in claim 1, wherein the (meth)acrylate composition comprises:
    the urethane (meth)acrylate oligomer with a functionality of 6 to 15 total to 35 to 50 weight parts;
    the at least one (meth)acrylate monomer with a functionality of 3 to 6 total to 12 to 20 weight parts; and
    the at least one (meth)acrylate monomer with a functionality of less than 3 total to 1.5 to 12 weight parts.

3. The hard coating film as claimed in claim 1, wherein the urethane (meth)acrylate oligomer with a functionality of 6 to 15 is an aliphatic urethane (meth)acrylate oligomer.

4. The hard coating film as claimed in claim 1, wherein the (meth)acrylate monomer with a functionality of 3 to 6 is selected from one of the group consisting of pentaerythritol tetra(meth)acrylate, dipentaerythritol penta(meth)acrylate (DPP(M)A), dipentaerythritol hexa(meth)acrylate (DPH(M)A), trimethylolpropane tri(meth)acrylate (TMPT(M)A), ditrimethylolpropane tetra(meth)acrylate (DTMPT(M)A) and pentaerythritol tri(meth)acrylate (PET(M)A), or combinations thereof.

5. The hard coating film as claimed in claim 1, wherein the (meth)acrylate monomer with a functionality of less than 3 is selected from one of a group consisting of 2-ethylhexyl (meth)acrylate (2-EH(M)A), 2-hydroxyethyl (meth)acrylate (2-HE(M)A), 2-hydroxypropyl (meth)acrylate (2-HP(M)A), 2-hydroxybutyl (meth)acrylate(2-HB(M)A), 2-butoxyethyl (meth)acrylate), 1,6-hexanediol di(meth)acrylate (HDD(M)A), cyclic trimethylolpropane formal (meth)acrylate (CTF(M)A), 2-phenoxyethyl (meth)acrylate (PHE(M)A), tetrahydrofurfuryl (meth)acrylate (THF(M)A), lauryl (meth)acrylate (L(M)A), diethylene glycol di(meth)acrylate (DEGD(M)A), dipropylene glycol di(meth)acrylate (DPGD(M)A), tripropylene glycol di(meth)acrylate (TPGD(M)A) and isobornyl (meth)acrylate, or combinations thereof.

6. The hard coating film as claimed in claim 1, wherein the initiator is selected from at least one of the group consisting of acetophenones, diphenylketones, propiophenones, benzophenones, α-hydroxyketones and fluorenylphosphine oxides.

* * * * *